United States Patent
Kim et al.

(10) Patent No.: US 11,159,298 B2
(45) Date of Patent: Oct. 26, 2021

(54) DMRS FOR 5G THINGS COMMUNICATION SYSTEM

(71) Applicant: Apple Inc., Cupertino, CA (US)

(72) Inventors: Joonbeom Kim, Carrollton, TX (US); Vesh Raj Sharma Banjade, Hillsboro, OR (US); Guangjie Li, Beijing (CN); Qian Li, Beaverton, OR (US); Satish Chandra Jha, Hillsboro, OR (US); Hassan Ghozlan, Hillsboro, OR (US); Dawei Ying, Hillsboro, OR (US); Yaser M. Fouad, Hillsboro, OR (US); Lu Lu, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 16/079,470

(22) PCT Filed: Oct. 28, 2016

(86) PCT No.: PCT/US2016/059300
§ 371 (c)(1),
(2) Date: Aug. 23, 2018

(87) PCT Pub. No.: WO2017/146779
PCT Pub. Date: Aug. 31, 2017

(65) Prior Publication Data
US 2019/0052442 A1 Feb. 14, 2019

Related U.S. Application Data

(60) Provisional application No. 62/300,332, filed on Feb. 26, 2016, provisional application No. 62/329,047, (Continued)

(51) Int. Cl.
*H04L 5/00* (2006.01)
*H04W 88/02* (2009.01)
(Continued)

(52) U.S. Cl.
CPC .......... *H04L 5/0057* (2013.01); *H04L 5/0051* (2013.01); *H04L 27/18* (2013.01);
(Continued)

(58) Field of Classification Search
CPC ... H04W 76/14; H04W 72/0446; H04W 4/70; H04W 4/40; H04W 88/04; H04L 4/0048; H04L 5/0007
See application file for complete search history.

(56) References Cited

U.S. PATENT DOCUMENTS

2007/0245384 A1 * 10/2007 Walter ................ H04W 88/02
725/62
2011/0150120 A1 6/2011 Hooli
(Continued)

FOREIGN PATENT DOCUMENTS

IN 201641003292 * 3/2019
JP 2016-157805 * 1/2015

OTHER PUBLICATIONS

Author Unknown, Discussion on randomization on DMRS, pp. 1-5, Doc No. R1-1608715, Oct. 14, 2016 (Year: 2016).*
(Continued)

*Primary Examiner* — Christopher M Crutchfield
(74) *Attorney, Agent, or Firm* — Kowert, Hood, Munyon, Rankin & Goetzel, P.C.

(57) ABSTRACT

Systems and methods of providing DMRS for a UE are generally described. The DMRS locations in a resource unit of a Physical Resource Allocation of a shared channel are randomly determined, and the DMRS sequences randomly generated before transmission from a master UE to a wearable UE. The DMRS locations are disposed on different subcarriers and symbols in the resource unit and are repeated every k subframes or m resource units within the same subframe. In situations in which the collision/contention
(Continued)

probability is relatively small, DMRS in control channels may be used rather than in the shared data channel.

26 Claims, 11 Drawing Sheets

Related U.S. Application Data filed on Apr. 28, 2016, provisional application No. 62/375,232, filed on Aug. 15, 2016.

(51) Int. Cl.
| | |
|---|---|
| *H04L 27/18* | (2006.01) |
| *H04W 76/14* | (2018.01) |
| *H04W 4/70* | (2018.01) |
| *H04L 29/08* | (2006.01) |
| *H04W 52/02* | (2009.01) |
| *H04W 72/02* | (2009.01) |
| *H04W 72/04* | (2009.01) |

(52) U.S. Cl.
CPC ............... *H04L 67/12* (2013.01); *H04W 4/70* (2018.02); *H04W 52/0212* (2013.01); *H04W 72/02* (2013.01); *H04W 72/048* (2013.01); *H04W 76/14* (2018.02); *H04W 88/02* (2013.01)

(56) References Cited

U.S. PATENT DOCUMENTS

| | | | |
|---|---|---|---|
| 2013/0294368 | A1 | 11/2013 | Bendlin et al. |
| 2016/0353440 | A1* | 12/2016 | Lee .................. H04W 72/0453 |
| 2017/0273128 | A1* | 9/2017 | Abedini ................ H04L 5/0069 |
| 2017/0366377 | A1* | 12/2017 | Papasakellariou .... H04L 27/261 |
| 2019/0068342 | A1* | 2/2019 | Kumar Parameswarn Rajamma .............. H04W 76/14 |
| 2019/0173612 | A1* | 6/2019 | Kimura ............... H04W 56/001 |
| 2020/0260355 | A1* | 8/2020 | Ma ........................ H04W 88/00 |

OTHER PUBLICATIONS

Author Unknown, Discussions on PUSCH design for NB-IoT, Doc. No. R1-160620, Feb. 19, 2016, pp. 1-7 (Year: 2016).*
Author Unknown, DMRS enhancement in PC5-based V2V, Doc. No. R1-155223, Oct. 9, 2015, pp. 1-4 (Year: 2015).*
Author Unknown,Remaining Issues forV2V, Doc. No. R1-1609955, Oct. 14, 2016 (Year: 2016).*
Author Unknown, WF on DMRS randomization, Doc. No. R1-1610465, Oct. 14, 2016 (Year: 2016).*
"Discussion on DMRS enhancements for PC5-based V2V", R1-160633, 3GPP TSG RAN WG1 Meeting #84, LG Electronics, (2016).
"International Application Serial No. PCT/US2016/059300, International Search Report dated Feb. 10, 2017", 3 pgs.
"International Application Serial No. PCT/US2016/059300, Written Opinion dated Feb. 10, 2017", 5 pgs.
Huawei, et al., "Discussion on DL RS for short TTI", R1-160293, 3GPP TSG RAN WG1 Meeting #84, (2016).
Nokia Networks, et al., "On UL DMRS design for NB-IoT", R1-160455, 3GPP TSG RAN1 Meeting #84, (2016).

* cited by examiner

FIG. 7

DMRS FOR 5G THINGS COMMUNICATION SYSTEM

PRIORITY CLAIM

This application is a U.S. National Stage Filing under 35 U.S.C. 371 from International Application No. PCT/US2016/059300, filed Oct. 28, 2016 and published in English as WO 2017/146779 on Aug. 31, 2017, which claims the benefit of priority to U.S. Provisional Patent Application Ser. No. 62/329,047 filed Apr. 28, 2016, entitled "SUBFRAME STRUCTURE FOR COMMUNICATION OF UNDERLAY INFRASTRUCTURE LESS NETWORKS," U.S. Provisional Patent Application Ser. No. 62/375,232, filed Aug. 15, 2016, and U.S. Provisional Patent Application Ser. No. 62/300,332, filed Feb. 26, 2016, each of which is incorporated herein by reference in its entirety.

TECHNICAL FIELD

Embodiments pertain to radio access networks. Some embodiments relate to wearable devices in various cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to 5G wearable devices and network interactions, in particular reference signal design.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, has severely strained network resources. New 3GPP standard releases related to the next generation network (5G) are taking into account the massive influx of low-data, high-delay and low power transmissions.

One type of user-based IoT devices developed recently whose popularity has exploded is IoT wearable devices. Unlike many MTC IoT devices, wearable devices may have a mobility similar to that of cell phones and a greater, albeit still limited, functionality. Wireless systems, however, may have a number of issues adapting to the various IoT devices. For example, existing wireless systems may be unable to handle the simultaneous needs of multiple wearable devices, which may include access to another device as well as communication using short/sparse data transmissions even in the risk of collisions at the receiver. Consequently, the next generation (5G) network may be designed to reduce unnecessary power consumption and resource waste by channel selection and estimation techniques using well designed reference signals to alleviate some of these issues.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 7 illustrates DMRS locations in a Resource Unit in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
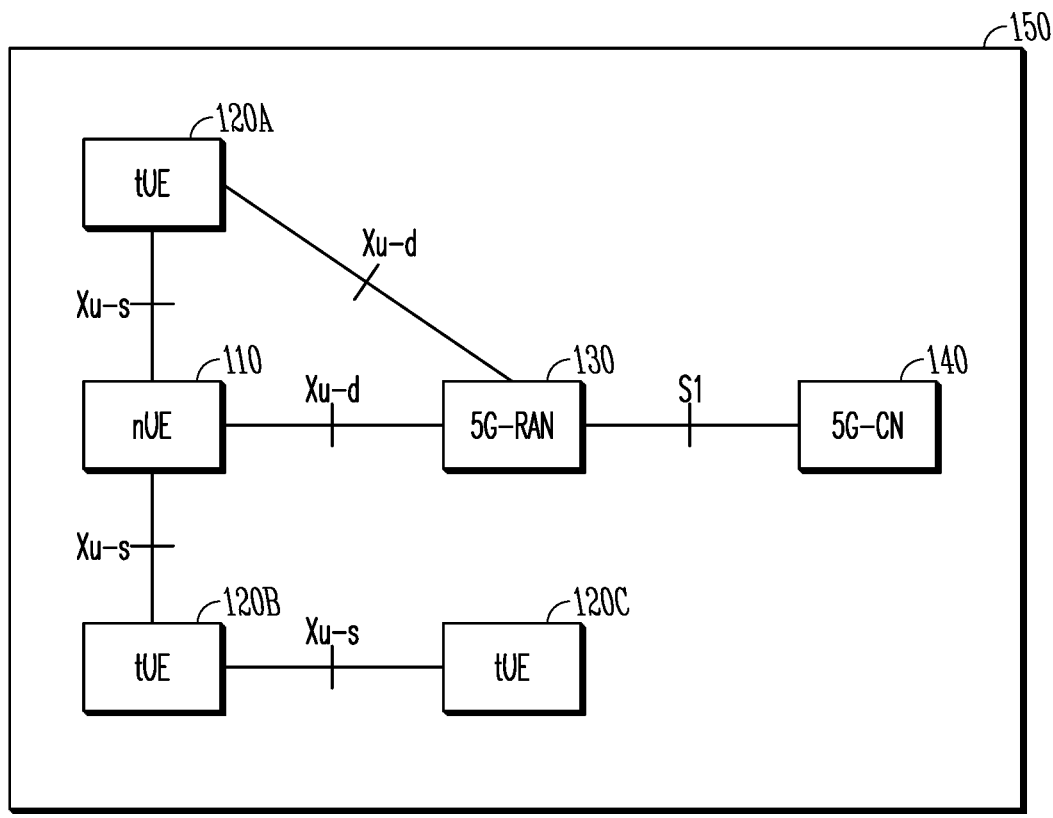
FIG. 1 is a block diagram of a system architecture for supporting wearable devices in accordance with some embodiments.

FIG. 1 is a block diagram of a system architecture 100 for supporting wearable devices. As shown, the system architecture 100 includes a network user equipment (nUE) 110, one or more things user equipment (tUEs) 120a, 120b, 120c, an evolved universal terrestrial radio access network (EU-TRAN) base station (BS, also referred to as an evolved NodeB (eNB)) or 5G base station 130, and an evolved packet core (EPC) or 5G core 140. The nUE 110 and the tUEs 120 together form a personal area network (PAN) 150 or side link cell.

The nUE 110 may be any user equipment capable of communicating with the base station 130 via an air interface. According to some examples, the nUE 110 may be a mobile phone, a tablet computer, a wearable device such as a smart watch, etc. According to some examples, the nUE may be a tUE that is capable of communicating with the base station 130 and has sufficient battery life (e.g., greater than 30%, 50%, 75%, 90% of the maximum amount of battery power etc.). The nUE 110 may have a full infrastructure network access protocol and full control and user plane (C/U-plane) functions. As shown, the nUE 110 may communicate with the base station 130 via a Xu-d (direct) air interface.

Each tUE 120 may include a wireless interface (Xu-d or Xu-s) for communicating within the PAN 150. The tUE 120 may communicate with the nUE 110 or another tUE 120 through the Xu-s (sidelink) intra-PAN air interface. The tUE 120 may include, for example, smart watches, smart glasses, smart headphones, fitness sensors, movement trackers, sleep sensors, etc. The tUE 120 may also communicate directly with the base station 130 via a Xu-d air interface. The nUE 110 may act as a master UE in a sidelink cell formed by the nUE 110 and associated tUEs 120. The tUE 120 may have a full sidelink protocol stack and may or may not have standalone direct link protocol stack. The tUE 120 may act as a slave UE in the side link cell. The nUE 110 may communicate data of the tUE 120 (either direct data or data of the tUE 120 modified by the nUE 110) to the base station 130. The data may be wearable UE data, for example, health related data or limited communication data, such as text data.

The base station 130 may be a base station of a cellular network. The base station 130 is may be an eNB in a LTE cellular network or a 5G Radio Access Network (RAN) in a next generation (5G) network. In the latter case, the 5G RAN may be a standalone base station or a booster cell anchored to an eNB. The base station 130 may communicate with a core network 140 (EPC for LTE or 5G core for 5G) using an S1 interface. Some aspects of the subject technology are directed to defining the air interface between the base station and the PAN of the nUE 110 and the tUEs 120, while other aspects are directed to defining the intra-PAN air interface for enabling low power operation with diverse traffic and application requirements.

Some aspects of the subject technology may be implemented in conjunction with a LTE network, and, in some cases, leverages device-to-device (D2D) and machine-type communications (MTC) technology. However, for connectivity techniques, aspects of the subject technology address high-density scenarios. For LTE-D2D, some aspects of the subject technology enable PAN-specific identity, unicast in intra-PAN communication, uplink and downlink features, and operation in unlicensed bands. For LTE-MTC, some aspects of the subject technology provide support for diverse traffic, including high rate traffic and low latency traffic.

The base station 130 may be a macro base station or a smaller base station (micro, pico, nano) that may terminate the air interface protocol. In some embodiments, the base station 130 may fulfill various logical functions for the RAN including, but not limited to, RNC (radio network controller functions) such as radio bearer management, uplink and downlink dynamic radio resource management and data packet scheduling, and mobility management. In accordance with embodiments, UEs 120 may be configured to communicate orthogonal frequency division multiplexed (OFDM) communication signals with the base station 130 over a multicarrier communication channel in accordance with an OFDMA communication technique. The OFDM signals may comprise a plurality of orthogonal subcarriers. In other embodiments, such as those related to 5G systems, non-OFDM signals may be used in addition or instead of OFDM signals.

The S1 interface may be the interface that separates the RAN 130 and the core network 140. The S1 interface may be split into two parts: the S1-U, which may carry traffic data between base stations of the RAN 130 and other elements of the core network, such as a serving GW, and the S1-MME, which may be a signaling interface between the RAN 130 and an MME.

Figure 2:
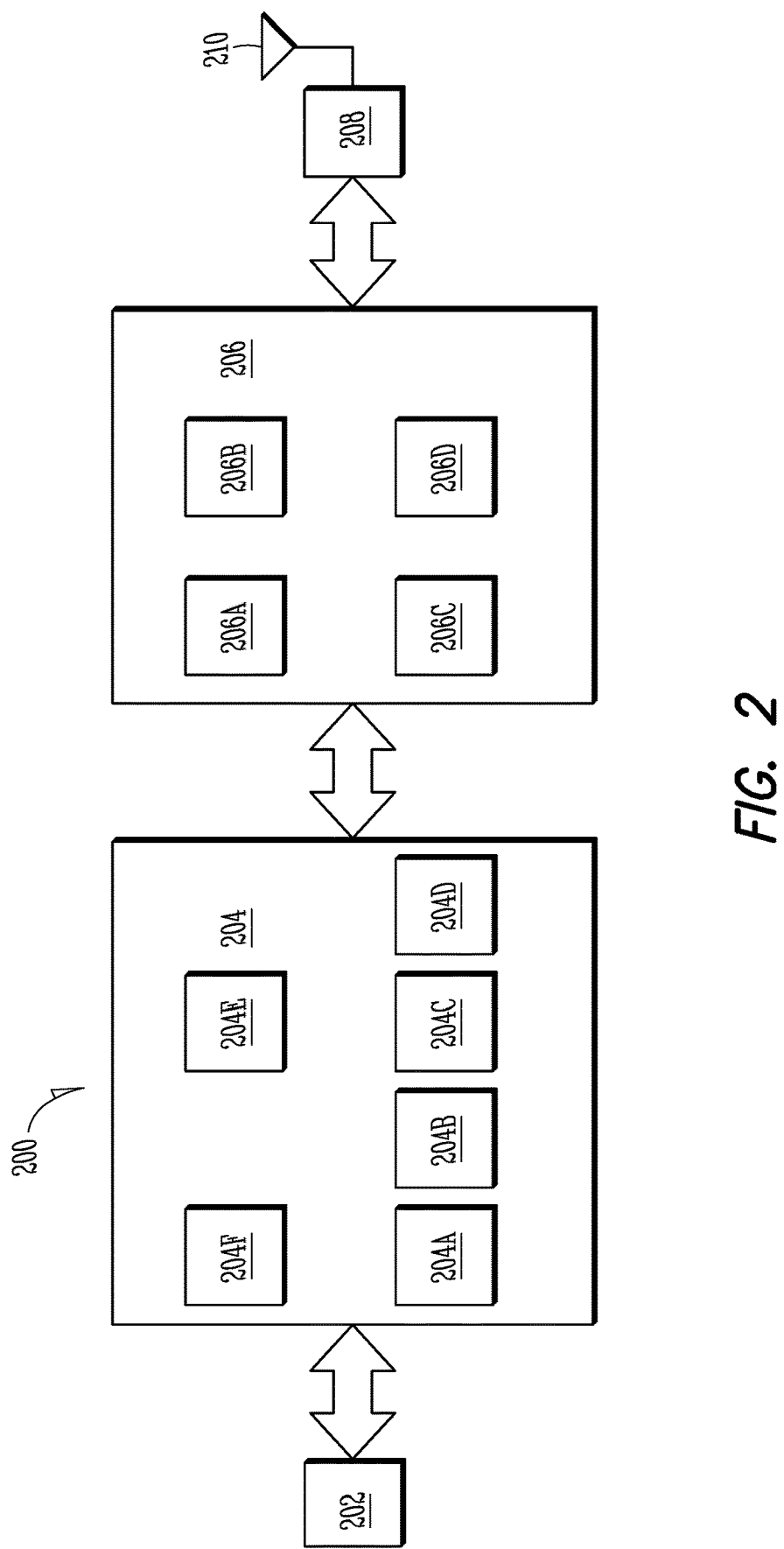
FIG. 2 illustrates components of a communication device in accordance with some embodiments.

FIG. 2 illustrates components of a communication device in accordance with some embodiments. The communication device 200 may be a UE, eNB or other network component as described herein. The communication device 200 may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the MME may contain some or all of the components shown in FIG. 2.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolutional, tail-biting convolutional, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an Evolved UTRAN (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 204e of the baseband circuitry 204 may be configured to run elements of the protocol stack for signaling of the PHY, MAC, RLC, PDCP and/or RRC layers, and/or NAS. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an EUTRAN and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature down-conversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct up-conversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLo). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
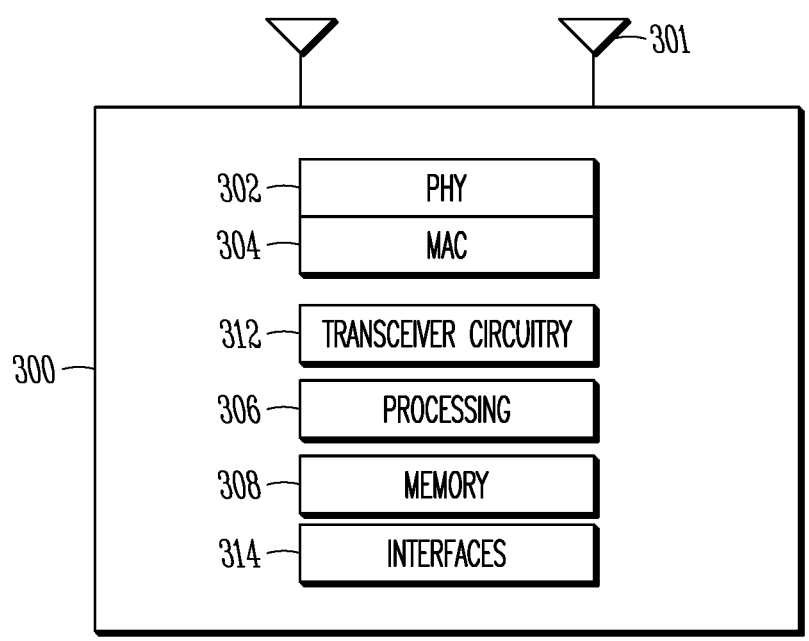
FIG. 3 illustrates a block diagram of a communication device in accordance with some embodiments.

FIG. 3 is a block diagram of a communication device in accordance with some embodiments. The device may be a UE, for example, such as the UE shown in FIG. 1. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
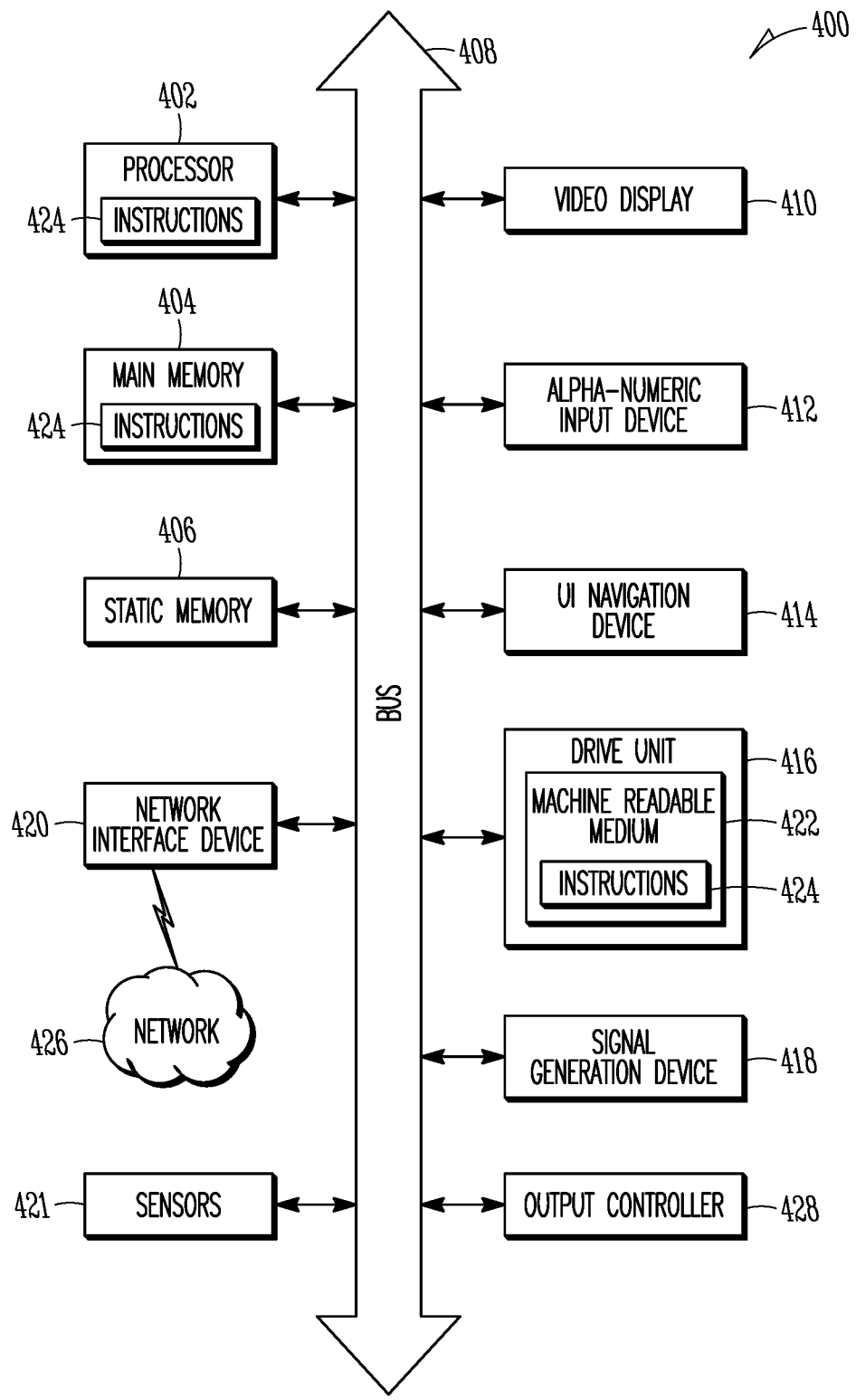
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions.

Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as WiFi®, IEEE 802.16 family of standards known as WiMax®), IEEE 802.15.4 family of standards, a LTE family of standards, a UMTS family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, a number of next generation challenges for PANs, whether coordinated or not, exist. Such challenges may include avoiding intra-PAN collisions between downlink (DL) and uplink (UL) transmissions within a PAN that induce inter-tUE interference. A DL transmission may be a transmission from the nUE to the tUE and a UL transmission may be a transmission from the tUE to the nUE. Other challenges include, reducing inter-PAN collisions or collision among PANs, fast power control and link adaption multi-user multiplexing within each PAN, and timely acknowledgment/non-acknowledgment feedback.

Table 1 provides one example of waveform and numerology of OFDM communications in the network shown in FIG. 1. The various options may provide a balance between FFT size and sampling rate.

TABLE 1

Numerology comparison

| Numerology | Option 1 | Option 2 | Option 3 |
| --- | --- | --- | --- |
| Subcarrier spacing | 15 KHz | 60 KHz | 75 KHz |
| Sampling rate (1/Ts) | 30.72 MHz (20 MHz, 2048-FFT) 1.92 MHz (1.4 MHz, 128-FFT) | 30.72 MHz (20 MHz, 512-FFT) 7.68 MHz (5 MHz, 128-FFT) | 38.4 MHz (20 MHz, 512-FFT) 9.6 MHz (6 MHz, 128-FFT) 4.8 MHz (2 MHz, 64-FFT) |
| Number of used subcarriers | 1200 72 | 300 72 | 240 72 24 |
| CP length | 32 Ts = 1.0417 us | 32 Ts = 1.0417 us | 36Ts = 0.9375 us |
| Symbol length | (2048 + 32) Ts = 67.708 μs | (512 + 32)Ts = 7.708 μs | (512 + 36)Ts = 14.27 μs |
| Number of symbols per subframe | 14 | 14 28 56 | 14 35 70 |
| Subframe length | 1 ms | 0.25 ms 0.5 ms 1 ms | 0.2 ms 0.5 ms 1 ms |
| Frame length | 10 ms | 2.5 ms 5 ms 10 ms | 2 ms 5 ms 10 ms |

Figure 5:
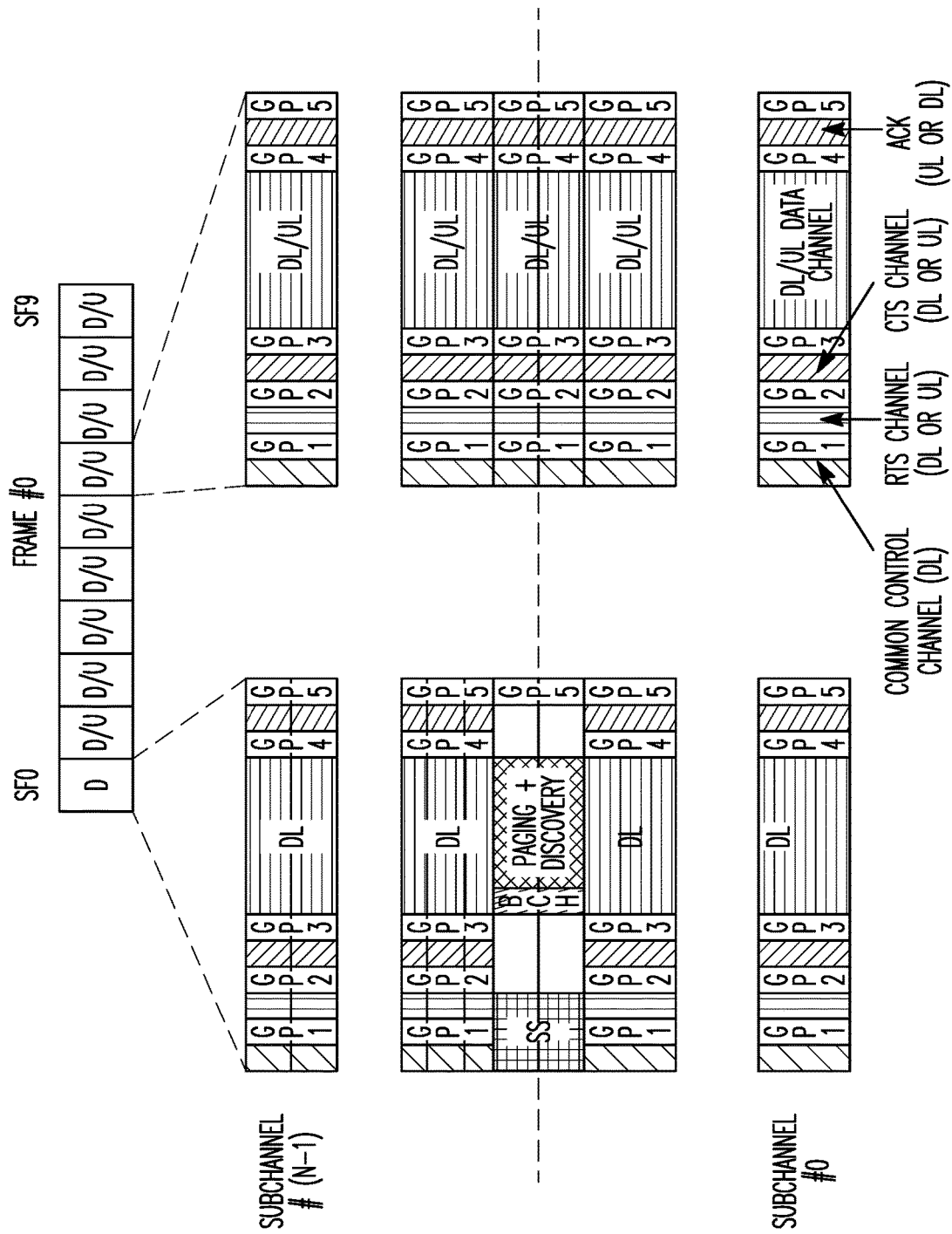
FIG. 5 illustrates a frame structure in accordance with some embodiments.
Figure 6A:
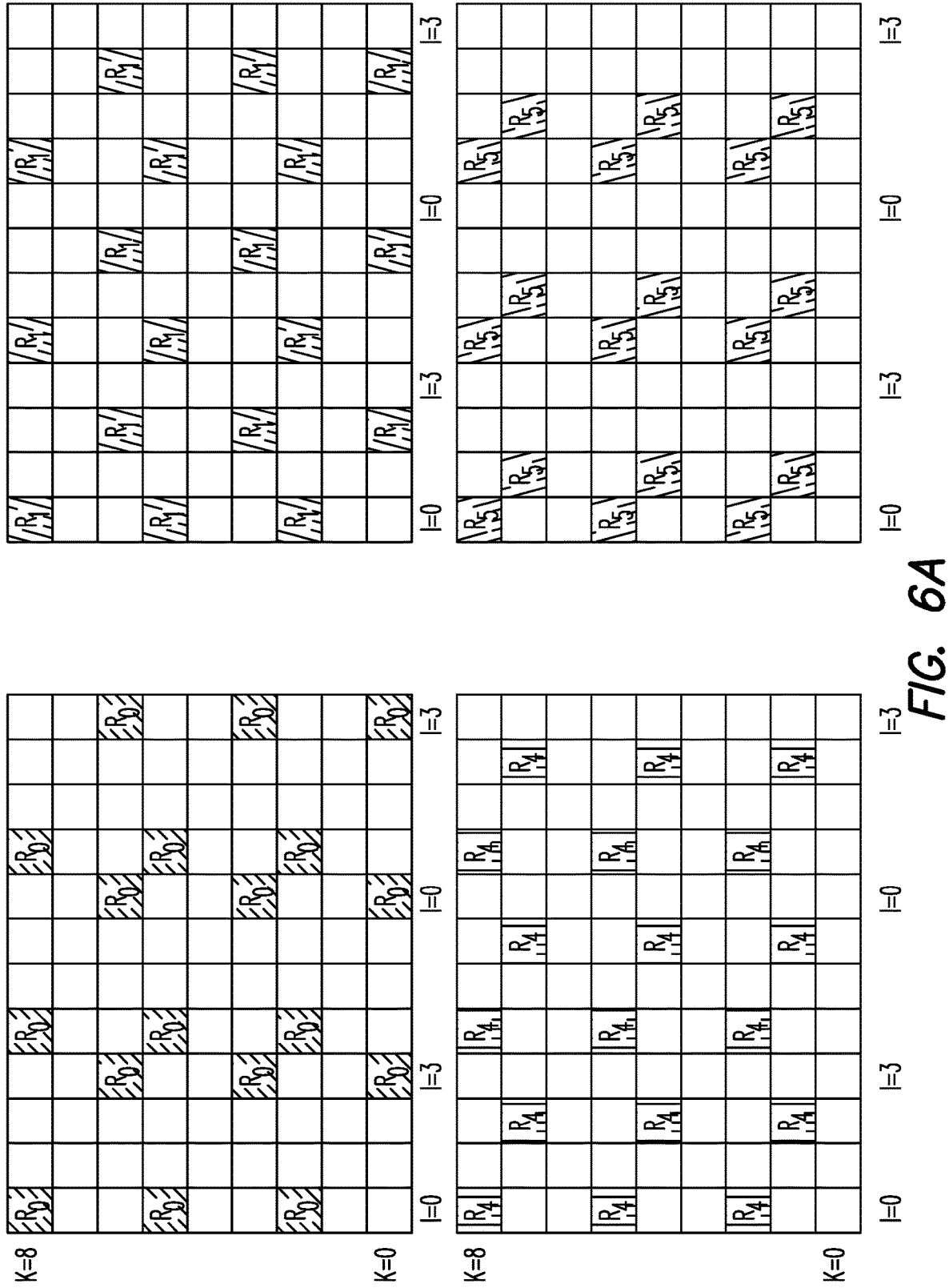
FIGS. 6A-D illustrate Demodulation Reference Signal (DMRS) locations in accordance with some embodiments.
Figure 6B:
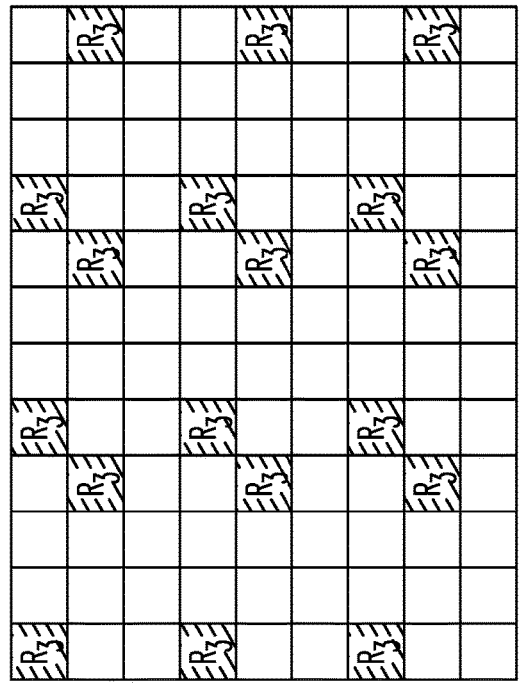
Figure 6B:
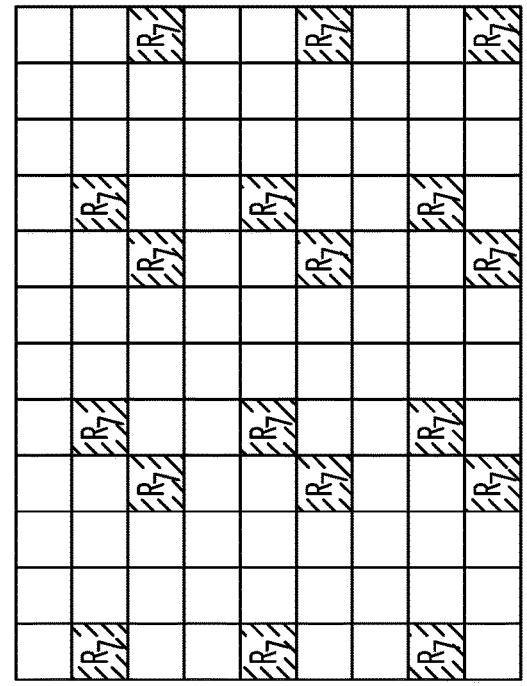
Figure 6B:
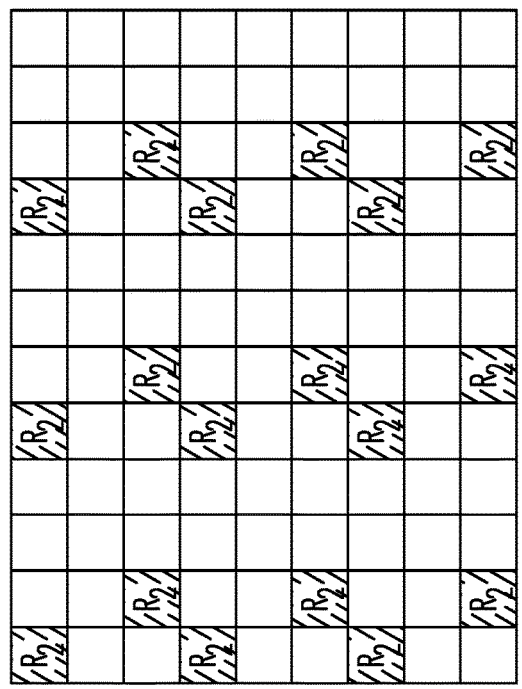
Figure 6B:
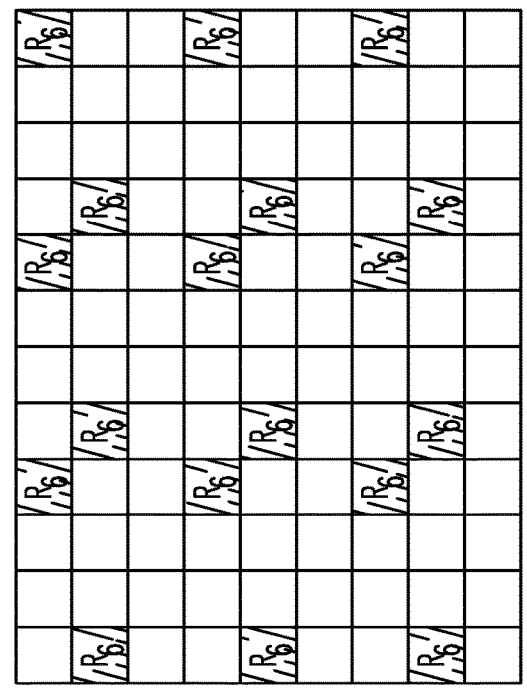
Figure 6C:
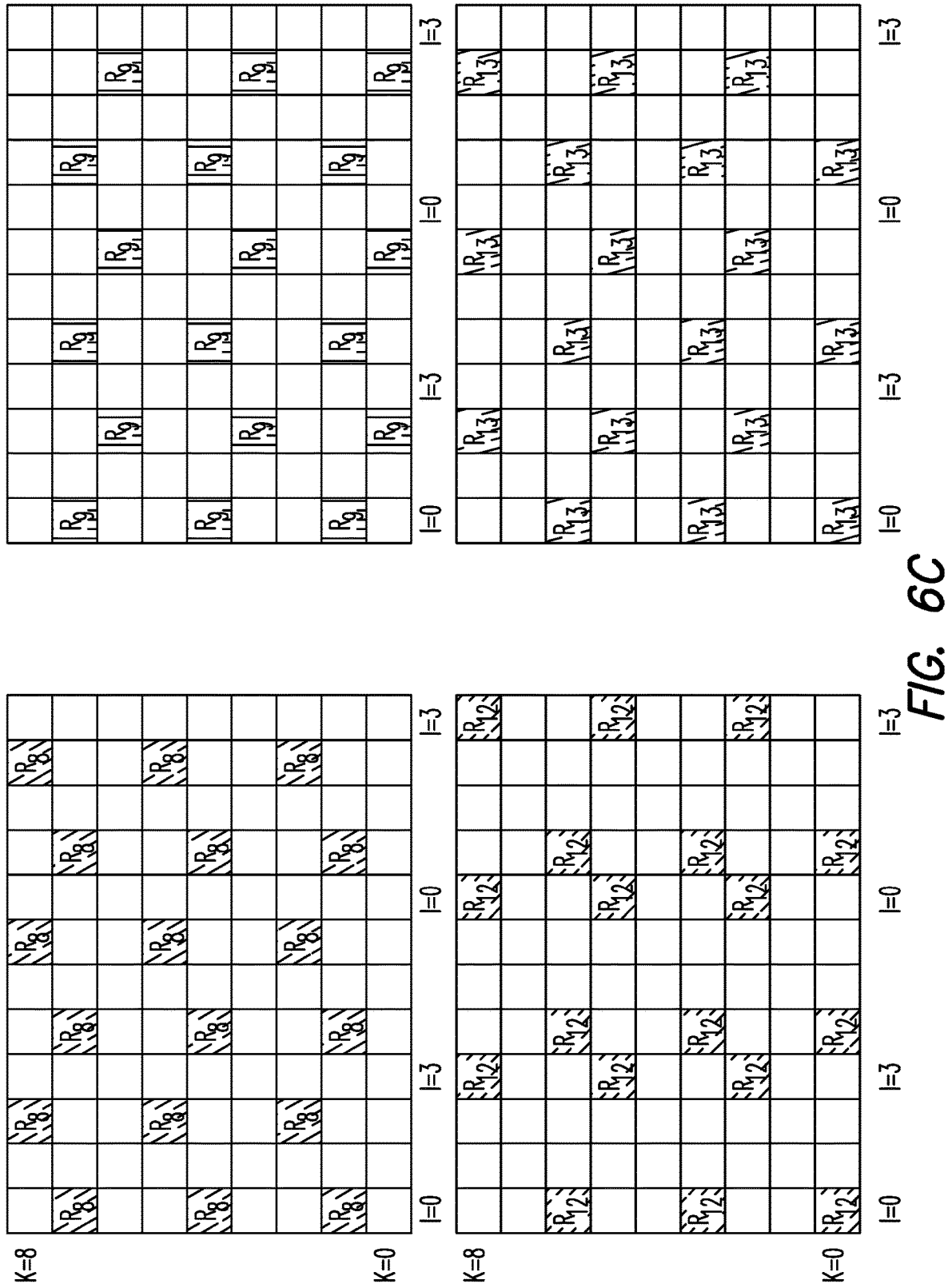
Figure 6D:
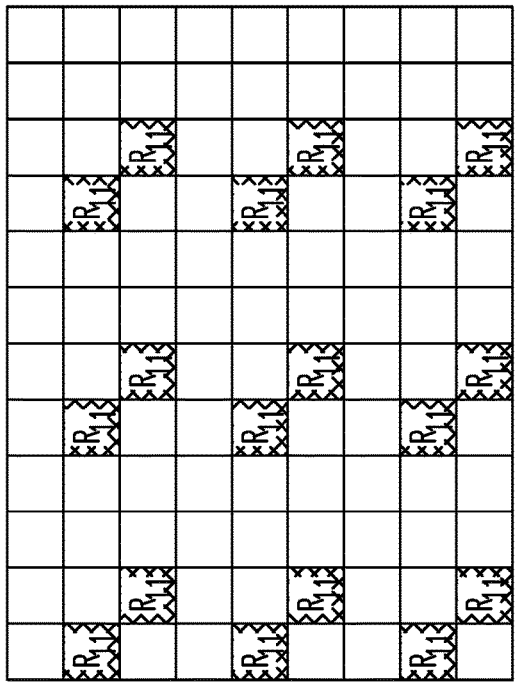
Figure 6D:
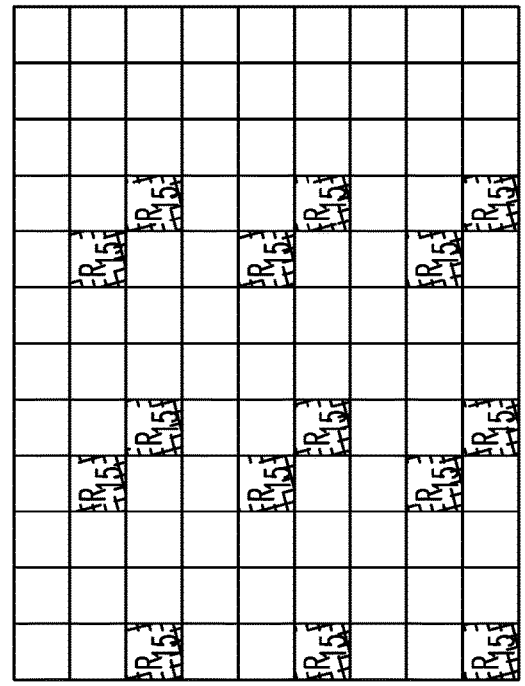
Figure 6D:
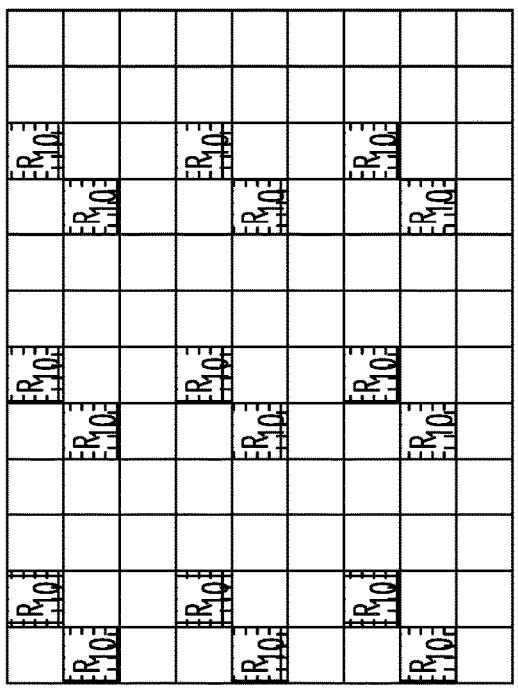
Figure 6D:
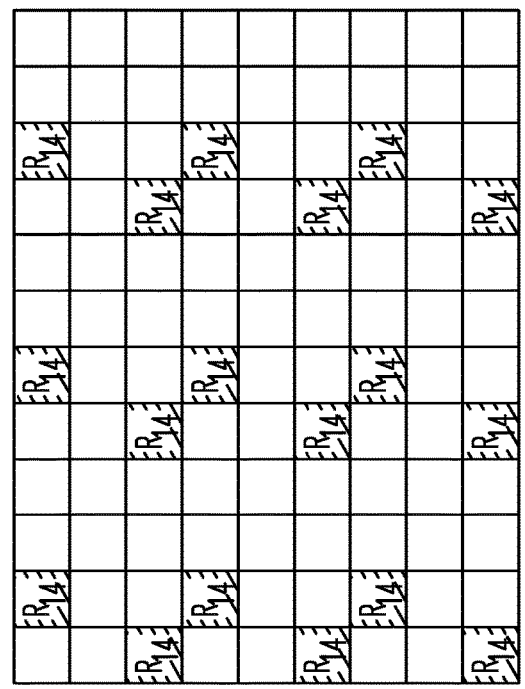

FIG. 5 illustrates a frame structure in accordance with some embodiments. The frame structure may be used by any of the UEs shown in FIGS. 1-4. As shown, each 10 ms frame comprises ten 1 ms subframes, although other numerologies such as subframe lengths of 0.25 ms, 0.5 ms, or 2 ms can also be supported. Each subframe may be divided into multiple physical resource blocks (PRB) in the frequency domain in which each PRB may occupy 3 subcarriers over one subframe. For a subcarrier spacing of 60 kHz and subframe duration of 1 ms, each PRB may occupy 180 kHz over 1 ms. The PRBs may be grouped into subchannels in which each subchannel occupies 6 PRBs consecutive in the frequency domain. The minimum system bandwidth is of the size of a subchannel.

The first subframe may be set to be a DL subframe, while the remaining subframes may be either UL or DL subframes. The subframes may be divided into a number of sections. The first symbol in the subframe may be a common control channel and may indicate whether the data channel is an UL or DL data channel Thus, the common control channel may be a DL common control channel independent of whether the data channel in the subframe is UL or DL. The DL common control channel may be followed by a Request to Send (RTS) (also called a Transmitter resource Acquisition and Sounding (TAS)) channel and subsequently a Clear to Send (CTS) (also called a Receiver resource Acknowledgement and Sounding (RAS)) channel. The RTS and CTS channel may be used for contention-based communications among UEs of the PAN. The contention channels may be followed by an UL or DL data channel in which data is provided from one UE to the other UE. This data may include ID and security information or user data. The data channel may be followed by an ACK/NACK in response to transmission of the data. The channels may be transmitted on a Physical Resource Allocation (PRA).

The various sections above may be separated by guard periods that reduce inter-symbol interference or permit the UE to switch between the transmitter and receiver chains. At least some of the guard periods may have different lengths. For example, the guard periods between the DL common control channel and the RTS, between the RTS and the CTS and after the ACK/NACK may occupy 1 symbol (17.7 µs total), the guard period between the CTS and the data channel may occupy 1 symbol+(26.03 µs total) and the guard period between the data channel and the ACK/NACK may occupy 2 symbols.

A majority of the subchannels in the system may be used to provide data between UEs. However, one or more of the subchannels may be reserved for control signaling. For example, 1-2 resource elements (REs) of one of the central 6 PRBs in the first DL subframe of each frame may provide broadcast channel information, as well as paging and discovery information. 1 RE may be defined as 1 subcarrier over 1 symbol, 1 resource unit (RU) may be defined as 3 subcarriers over 4 consecutive symbols (in total 12 REs). In some embodiments, the DL common control channel, the RTS, the CTS and the ACK may each occupy one RU, while the data channel may occupy the 3 subcarriers over 34 symbols. The total subframe in this embodiment may thus extend over 56 symbols (including the above guard periods).

Design of reference signals for control and data signals in the subframe may be one challenge facing wearable systems. Time selectivity, in particular, may present a challenge in implementing wireless communication systems. To coherently detect the signals, receivers should be aware of the channel variation. Thus, it may be desirable to continuously track and update the channel parameters. To estimate the unknown wireless channel parameters (channel quality for the allocated resources) and detect user data coherently, reference signals may be inserted between the data signals in an approach called pilot-symbol assisted modulation (PSAM). The pilot symbols may be periodic messages and may be in some embodiments Demodulation Reference Signals (DMRS). Unlike typical LTE networks, each nUE may transmit separate DMRSs for the tUEs to detect. In some embodiments, the reference signals are power boosted compared to user data signals (either that would be on the PRA or are on another PRA), exacerbating interference and other issues with other PANs. The complex representation of a wireless channel impulse response at the time domain is given by:

$$h(t, \tau) = \sum_{k=0}^{L-1} c_k(t)\delta(\tau - \tau_k) \quad (1)$$

where L is the number of wireless channel multipaths, $\tau_k$ is the delay of the kth path, and $c_k(t)$ is the corresponding complex amplitude. Due to the motion of the UEs, $c_k(t)$ can be modeled as wide-sense stationary and narrowband complex Gaussian process with average power of $\sigma_k^2$'s, where its values are independently distributed. The frequency response of the wireless channels at time t can be expressed as $$H(t, f) = \sum_{k=0}^{L-1} c_k(t) e^{-j2\pi f \tau_k}. \quad (2)$$

To support a large number of nUE and tUE pairs on the same time-frequency resources where inevitable contentions or collisions cause significant inter-PAN interference, efficient DMRS design is desirable. Design principles of the DMRS include both randomization of the occurrences of inter-PAN DMRS collisions and robust DMRS locations and patterns for the low-cost UEs. To this end, the DMRS locations for each PAN may be randomly selected in the RU. This may occur even if a large number of inter-PANs exist on the underlay network. This may also allow for robust channel estimation quality even if synchronization is less accurate in the lower-cost UEs. Although the discussion below focuses on the DMRS design for Option 2 with 512-FFT length as shown in Table 1, similar processes may be used for other options and other FFT lengths.

In addition to being used to estimate the channel quality (or channel coefficients) and detect the user data coherently, DMRSs may also be used for link adaptation to select appropriate modulation coding schemes (MCSs). Increasing contention may occur as the number of nUE and tUEs (and thus PANs) increase, leading to an increase in the number of candidate DMRS locations and sequences. This may lead to selection of DMRS patterns and locations to minimize the inter-PAN collision occurrences. DMRS, like other reference signals, may be transmitted only on assigned PRAs, with the assigned PRAs known via higher layer signaling or some other mechanism. FIG. 6 illustrates DMRS locations in accordance with some embodiments. As shown in FIG. 6, two DMRSs are transmitted on each RU, with the DMRS locations of 3×3 RUs being illustrated. As above, the power of the DMRS signals in these locations is boosted, compared to user data signals, to provide better channel estimate quality, so that each DMRS would be better to be placed on distinctive OFDM symbols.

Each PAN may have a single nUE and one or more tUEs. Each nUE may randomly select the DMRS locations. The DMRS location may, in some embodiments, be selected using the temporary nUE ID to randomize the locations, thereby reducing the collision probabilities. The temporary nUE ID may be generated using the MAC ID of the nUE, for example, by hashing the MAC ID. The locations/may be selected by:

$$l = (n\text{UE ID}) \bmod N_{RS}^{Set}$$

where $N_{RS}^{Set}$ is the number of available DMRS locations. In FIG. 6, DMRS signals in which $N_{RS}^{Set}=16$ (Option 2 with 20 MHz bandwidth), as an example. The temporary nUE ID may be determined by the corresponding tUEs in the PAN during a discovery process in which the tUEs associate with the nUE. Alternatively, the DMRS location can also be chosen in a pseudo-random manner. In this case, the pseudorandom sequences c(i) may be defined by a length-31 Gold sequence. The output sequence c(n) of length $M_{PN}$, where n=0, 1, . . . , $M_{PN}$−1, may be represented as:

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_1(n)) \bmod 2$$

where $N_c$=bin2dec(nUEID) and $x_1(n)$ is initialized with $x_1(0)=1$ and other values are zeros. The initial value of $x_2(n)$ is initialized with $c_{init}$=nUE ID, where nUE ID is the temporary nUE ID. The DMRS location, l, is selected by $$l = \text{bin2dec}(c([Q, \ldots, 1])),$$

where $Q = \lfloor \log_2 N_{RS}^{Set} \rfloor$.

The reference signal sequence may be generated in a number of ways. For example, the reference signal sequence may be generated using a pseudo-random sequence or a Zadoff-Chu sequence. The generated sequences may be mapped onto the modulation scheme with constant envelope. In some embodiments, for pseudo-random sequences with quadrature phase shift keying (QPSK), the reference signal sequence $r_{l,d}$ (m) of the $l^{th}$ DMRS location may be given by:

$$r_{l,d}(m) = \frac{1}{\sqrt{2}}(1 - 2 \cdot c(2m)) + \frac{j}{\sqrt{2}}(1 - 2 \cdot c(2m+1)),$$

$$m = 0, 1, \ldots, 2N_{Subframe}^{max} - 1$$

where the link indicator d is 0 for DL and 1 for UL and $N_{Subframe}^{max}$ is the maximum number of DMRS within a subframe. The pseudo random sequences c(i) may be defined in some embodiments by a length-31 Gold sequence. The output sequence c(π) of length $M_{PN}$, where n=0, 1, . . . , $M_{PN}$−1 may be given by:

$$c(n)=(x_1(n+N_c)+x_2(n+N_c)) \mod 2$$

$$x_1(n+31)=(x_1(n+3)+x_1(n)) \mod 2$$

$$x_2(n+31)=(x_2(n+3)+x_2(n+2)+x_2(n+1)+x_1(n)) \mod 2$$

where $N_c$=1600 and $x_1$ (n) may be initialized with $x_1$ (0)=1 and other values are zeros. The initial values of $x_2$ (n) may be initialized with $c_{init}=2^{K_1+6} \cdot (N_{RS}^{Set} \cdot (n_s+))+2^{K_1+1} \cdot (N_2+1) \cdot (n_s+1)+2 \cdot N_1+d$, where $n_s$ is the subframe number, the link indicator d is 0 for DL and 1 for UL, $N_1$=bin2dec([$K_1$, . . . , 1]), $N_2$=bin2dec([$K_2$, . . . , 1]), and $K_1$ and $K_2$ are the number of the last bits taken from the tUE ID and nUE ID, respectively. In other embodiments, other bits of the IDs, such as the first bits may be used. The bits use may be the same between the tUE ID and the nUE ID (e.g., the last two bits) in some embodiments. In other embodiments, bits may be present in different positions (e.g., the last bits of the tUE ID and the first bits of the nUE ID).

In some embodiments, a Zadoff-Chu (ZC) sequence may be used rather than a pseudorandom sequence. In this case, the ZC reference signal sequence $r_{u,v}^{(\alpha)}$ (n) may be defined by a cyclic shift a of a base sequence $\bar{r}_{u,v}(n)$ according to:

$$r_{u,v}^{(\alpha)}(n) = e^{-\frac{j\alpha 2\pi}{N_{RS}^{Set}}} \bar{r}_{u,v}(n), 0 \leq n \leq N_{RS}^{subframe}$$

where $\alpha \in \{0, N_{RS}^{Set}-1\}$ and $N_{RS}^{Subframe}$ is the length of available reference signals within a subframe. Multiple reference signal sequences may be defined from a single base sequence through different values of α.

$$\bar{r}_{u,v}=x_q(n \mod N_{RS}^{subframe}), 0 \leq n < N_{ZC}$$

where the link indicator v is 0 for DL and 1 for UL, $$x_q(m)=e^{-jqm(m+1)/N_{ZC}}, 0 \leq m < N_{ZC}-1$$

$$q=u'+v \cdot (-1)^{u'}$$

$$u'=[bin2dec(M+1)] \mod N_{ZC}$$

$M$=concat($K_2$ bits of $n$UE ID; last $L$ bits of $w$UE ID)

In some embodiments, M-ary phase shift keying (MPSK) may be used rather than QPSK. In this case, the pseudorandom sequences may differ from those for QPSK. Reference signal sequence $r_{l,d}$ (m) of the $l^{th}$ DMRS location may be given by:

$$r_{l,d}(m)=e^{-j \cdot \varphi(m)/2\pi}, m=0,1, \ldots, N_{Subframe}^{max}-1$$

where the link indicator d is 0 for DL and 1 for UL and $N_{Subframe}^{max}$ is the maximum number of DMRS within a subframe. The mapping function φ(m) may be defined as:

$$\varphi(m) = k \cdot \frac{2\pi}{M},$$

where k is equal to bin2dec(c([P, . . . , 1]+m·P)), where P=$\log_2$ M. Note that M is the power of 2. The pseudo random sequences c(i), as above, may be defined by a length-31 Gold sequence. The output sequence c(n) of length $M_{PN}$, where n=0, 1, . . . , $M_{PN}$−1 may be given by:

$$c(n)=(x_1(n+N_c)+x_2(n+N_c)) \mod 2$$

$$x_1(n+31)=(x_1(n+3)+x_1(n)) \mod 2$$

$$x_2(n+31)=(x_2(n+3)+x_2(n+2)+x_2(n+1)+x_1(n)) \mod 2$$

where $N_c$=1600 and $x_1$ (n) is initialized with $x_1$ (0)=1 and other values are zeros. The initial values of $x_2$ (n) is initialized with $c_{init}=2^{K_1+6} \cdot (N_{RS}^{Set} \cdot (n_s+1))+2^{K_1+1} \cdot (N_2+1) \cdot (n_s+1)+2 \cdot N_1+d$, where $n_s$ is the subframe number, $N_1$=bin2dec([$K_1$, . . . , 1]), $N_2$=bin2dec([$K_2$, . . . , 1]), and $K_1$ and $K_2$ may be the number of the last bits taken from the tUE ID and nUE ID, respectively. In other embodiments, as above, the bits may be different.

Thus, after the nUE selects the DMRS location and sequence, the tUEs within the PAN may use the same location and different sequences. The sequences may differ as the seed of random sequence may be different. The sequence can be different in depending on each tUE ID. The nUE and tUE may have the same transmission functionality and detect the DMRSs, but location selection may be performed only by the nUE.

Simulation results of the DMRS performance show the criteria to to decide locations of the DMRSs out of the total number of candidates, which cardinality consists of $$\binom{12}{k}$$

combinations, where k is the number of DMRSs in each RU. Since k is set to 2, the number of unique DMRS locations is 66. Table 2, below provides the simulation parameters used.

TABLE 2

| Simulation parameters for link-level simulation | | | |
|---|---|---|---|
| Simulation Parameters | Values | Simulation Parameters | Values |
| Carrier (MHz) | 2000 | Frame structure | Option 2 |
| Symbol duration (us) | 17.7 | FFT size | 512 |
| Bandwidth (MHz) | 20 | Channel model | EPA, TU, Exp 3 km/h |
| Antenna configuration | 1 Tx and 1 Rx | Doppler (Hz) | 5.56 |

TABLE 2-continued

Simulation parameters for link-level simulation

| Simulation Parameters | Values | Simulation Parameters | Values |
| --- | --- | --- | --- |
| FEC | Data channel: 1/3 Convolutional codes as mother code ([1.33, 171, (165)]) | Modulation | Data channel: BPSK, QPSK, 16QAM, 64QAM |
| Channel estimation | 2-D Wiener filters (B-by-B) Average, LS estimate | Resource allocations (1 PRA) | 1, 2, and 3 PRBs |

Figure 7:
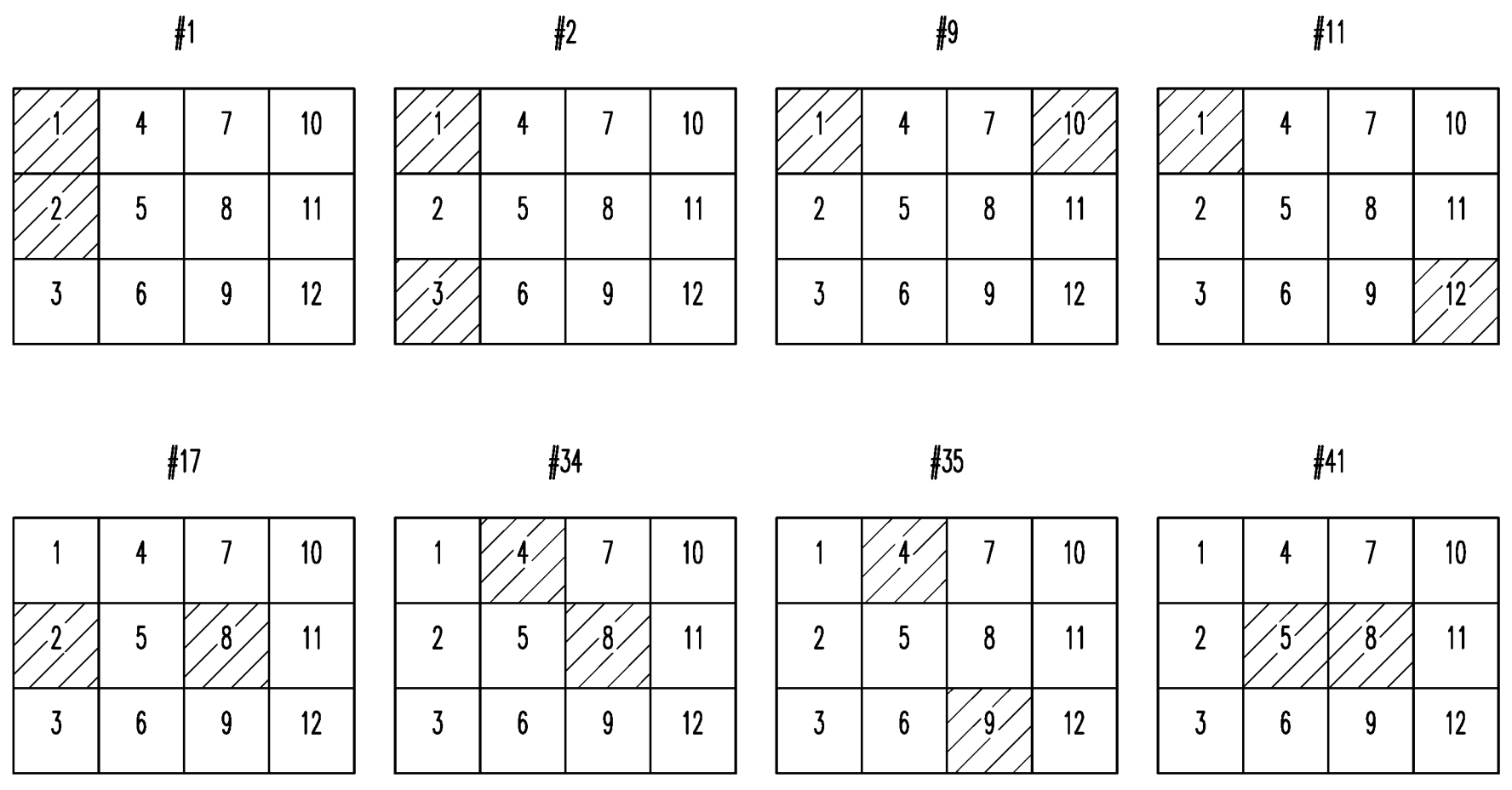

The simulations were performed to indicate the error performance for data channels without a timing mismatch (having a timing advance of zero) under frequency-selective channels. FIG. 7 illustrates DMRS locations in a RU in accordance with some embodiments. To determine optimized DMRS locations on an RU, the channel estimators may be simulated for various DMRS locations with two reference signals on an RU. As above, a single RU is 3 subcarriers in width and 4 symbols in length. The examples shown in FIG. 7 are not exclusive—they merely reflect individual layouts of the 66 possible DMRS locations. For example, DMRS location #11 in FIG. 7 illustrates the DMRS layout shown in the upper left embodiment shown in FIG. 6. For Extended Pedestrian A model (EPA)-3 km/h, channel estimators using an average method show similar performance of minimum mean square error (MMSE) channel estimators since the wireless channel characteristics of EPA at the frequency domain is less frequency selective. However, worse MSE is observed in the average method, as channel estimators with average do not match with channel statistics, especially in a high signal-to-noise ratio (SNR) region.

The simulations were performed to indicate the error performance for data channels with a timing mismatch under frequency-selective channels. The synchronization of wearable or IoT UEs (tUEs) may not be accurate enough compared to normal cellular or high-end devices because the tUEs may be designed to be cost-effective and power-effective. Thus, the symbol timing mismatch should be considered for DMRS designs as timing mismatch may occur more frequently. The simulations indicate that error performance may vary depending on the DMRS locations when symbol timing mismatch exists. In such embodiments, error performance may be improved if the DMRSs are placed on different subcarriers and different OFDM symbols in an RU when wireless channels are more frequency-selective.

The effect of timing mismatch on error performance for an exponential channel, rather using EPA channels, was also measured to make the channel marginally selective, $$p_d(\tau) = e^{-\frac{\tau}{2}}, \tau = \{0, 2, \ldots, 24\} \cdot T_s.$$

In case of 16 sample timing mismatches, MMSE methods showed about 2.5 dB degradation from the error performance with perfect channel information, while the average method showed a slightly worse performance than that of the MMSE method. Least squares (LS) methods showed 3 dB degradation from the error performance with MMSE methods. However, the channel estimator with MMSE methods employs the channel statistics, which may be measured empirically in practical systems, while the estimator with average or LS methods does not use such information and thus may be more practical.

Figure 8:
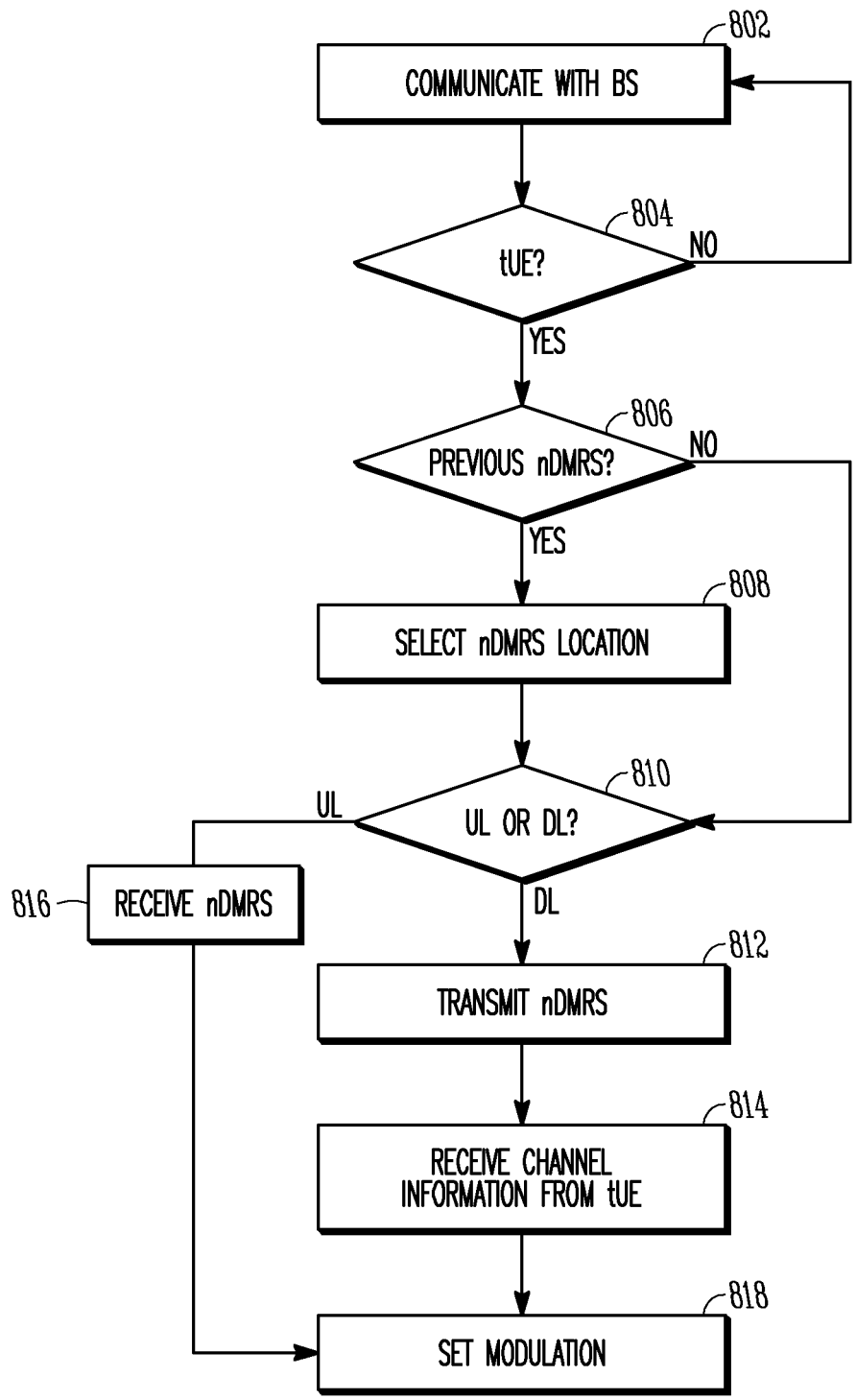
FIG. 8 illustrates a flowchart of DMRS generation in accordance with some embodiments.

FIG. 8 illustrates a flowchart of DMRS generation in accordance with some embodiments. The method shown in FIG. 8 may be performed by any of the UEs described in FIGS. 1-4. Examples of possible DMRS locations ultimately selected may be shown in FIG. 6.

At operation 802, the nUE may communicate with a base station. The base station may be an eNB or other LTE base station or a 5G base station. The base station may be a macro base station or a micro (pico/nano) base station. The communications may include both data and control communications.

At operation 804, the nUE may determine whether any tUE is associated with the nUE. If not, the nUE may determine that there is no reason to transmit its own DMRS (referred to as nDMRS) as no tUEs are around to respond to the nDRMS. The nUE may store tUEs that have associated with the nUE via a discovery mechanism to determine whether tUEs are present. If a tUE has associated with the nUE but has not exchanged data or control signals with the nUE in a predetermined amount of time (or has specifically sent a de-association signal to the nUE), the nUE may determine that the tUE is no longer associated with the nUE. In other embodiments, the nUE may transmit nDMRS independent of whether tUEs are present.

At operation 806, after having determined that at least one tUE is present, the nUE may determine whether nDMRS have already been transmitted to the tUE. Once determined, the nUE may continue to use the same nDMRS. Alternatively, the nUE may change the nDMRS from time to time, based on an event such as a predetermined amount of time passing, a predetermined number of tUEs in the PAN or a predetermined density of neighboring PANs/nUEs.

If previously determined nDMRS are not to be used, the nUE may at operation 808 select nDMRS locations in a RU of a PRA in a shared data channel. The nDMRS locations may be selected to minimize inter-PAN collision occurrences. In some embodiments, the nDMRS location selection is randomized. In some embodiments, the temporary nUE ID, the MAC ID and/or a combination of IDs may be used to determine the randomization. In some embodiments, the ID or combination may be known to the tUEs to permit the tUEs to determine the nDMRS locations. In other embodiments, the nDMRS locations may be indicated to the tUEs via higher layer signaling. The nDMRS locations may, in some embodiments, be randomized using a pseudo-random function. For example, the nDMRS locations may be defined by a length-31 Gold sequence. In some embodiments, the nDMRS from different nUEs are disposed on different subcarriers and different OFDM symbols in an RU.

Once the nDMRS locations are determined, the nDMRS sequence may be generated. nDMRS sequence generation may be independent of the manner in which the nDMRS locations are selected. In some embodiments, the nDMRS sequences may be pseudo-random. The random sequence may permit nDMRS sequences to be distinct between PANs and within the PAN. In some embodiments, according to the pseudo-random nDMRS sequences, the modulation with constant envelope (e.g., MPSK, QPSK) may be selected for communications between the nUE and the tUE pairs. Alternatively, the nDMRS sequences may be based on a Zadoff-Chu sequence. In some embodiments, the placement of the nDMRS may depend on placement of the nDMRS of neighboring nUEs.

After generation of the nDMRS, at operation 810, different operations may occur dependent on whether the nDMRS are UL or DL nDMRS. Some of the nDMRS characteristics may remain the same between UL and DL nDMRS transmissions, while others may differ.

If the nDMRS are DL nDMRS, at operation 812, the nDMRS may be transmitted by the nUE on the shared data channel. The power of the nDMRS may be higher than that of data communications between the nUE and the tUE. The nDMRS locations and sequences can be transmitted periodically, e.g., every n subframes or m RUs in a subframe, with the period configured by higher layer signaling or being a configuration parameter broadcast by the nUE or base station associated with the nUE. In some circumstances, however, the nDMRS may not be transmitted on the data shared channel; for example if the nUE determines that the probability for collision or contention is less than a predetermined percent. The probability determined by the nUE may be based on the number of tUEs in the PAN and/or the density of neighboring PANs. In such embodiments when DMRSs are applied only to the control channels (e.g., common control, TAS, RAS, and ACK channels), channel estimates for the shared data channel can be obtained by DMRS on the control channel and demodulated control signals, in particular the TAS (RTS) channel.

If the DMRS is removed from the data shared channel, the channel coefficients from the TAS channel can be used for coherent detection on the data shared channels. In other embodiments, if the collision or contention probability is less than a predetermined value, use of the control channels (common control, TAS, RAS, and ACK channels) for transmission of the DMRS may be avoided. In some embodiments, the DMRS can be inserted on every k RU on the data shared channel instead of sending DMRSs on every RU.

The tUEs associated with the nDMRS may decode the nDMRS. The tUE may measure the RSSI, SNR, SINR, BLER or other characteristic of the nDMRS to determine information of the channel quality. The tUE may then provide the information determined from the DMRS to the nUE at operation 814.

If the nDMRS are UL nDMRS, at operation 816, the nUE may receive the nDMRS from the tUE. That is, the tUE may generate the nDMRS. In this case, as above, a similar nDMRS pattern (i.e., the same nDMRS locations) can be used by the tUE side for UL data transmission. However, while the nDMRS location may be selected by the nUE (or using information such as the nUE temporary ID), the nDMRS sequence generated and transmitted by the tUE may be different than that generated and transmitted by the nUE. In some embodiments, the seed used to generate the pseudo-random sequence may be different (e.g., the nUE temporary ID vs. the tUE temporary ID). In some embodiments, the UL and DL nDMRS locations may be different but can be paired based on a predetermined mapping rule, such as (DL, UL)→(R0, R1), (R1, R2), etc.

At operation 818, the nUE may determine the appropriate modulation scheme or MCS to use. The nUE may make the determination based on the channel quality information determined by the nUE based on the UL nDMRS from the UE or from the channel quality information determined by the tUE from the DL nDMRS measurements made by the tUE.

EXAMPLES

Example 1 is an apparatus of user equipment (UE), the apparatus comprising: memory; and processing circuitry in communication with the memory and arranged to: randomize Demodulation Reference Signal (DMRS) locations of a DMRS in a resource unit (RU) of a predetermined Physical Resource Allocation (PRA) of a shared channel for transmission to another UE; generate DMRS sequences for transmission to the other UE in the DMRS locations; and in response to transmission of the DMRS, decode channel quality information received from the other UE based on the DMRS.

In Example 2, the subject matter of Example 1 optionally includes, wherein: the DMRS sequences are random sequences defined by one of a length-31 Gold sequence or a Zadoff-Chu sequence.

In Example 3, the subject matter of Example 2 optionally includes, wherein: each random sequence is mapped onto M-ary phase shift keying (MPSK) signal modulation.

In Example 4, the subject matter of any one or more of Examples 1-3 optionally include, wherein: each RU of the PRA comprises a pair of DMRS having a transmission power higher than that of data signals in the RU of another PRA in the shared channel.

In Example 5, the subject matter of any one or more of Examples 1-4 optionally include, wherein the processing circuitry is configured to: replicate the DMRS locations every predetermined number of subframes, and configure the predetermined number of subframes by higher layer signaling or broadcast as a configuration parameter.

In Example 6, the subject matter of any one or more of Examples 1-5 optionally include, wherein the processing circuitry is configured to: replicate the DMRS locations every predetermined number of RUs of the shared channel in a subframe, the predetermined number being an integer greater than 1, and configure the predetermined number of RUs by higher layer signaling or broadcast as a configuration parameter.

In Example 7, the subject matter of any one or more of Examples 1-6 optionally include, wherein the shared channel is a shared data channel and the processing circuitry is configured to: condition transmission of the DMRS based on at least one of a collision or contention probability, the at least one of a collision or contention probability based on at least one of a number of other UEs in a personal area network (PAN) associated with the UE or a density of neighboring PANs associated with other UEs, and in response to a determination that the at least one of the collision or contention probability is less than a predetermined value, avoid use of the shared data channel for transmission of the DMRS.

In Example 8, the subject matter of any one or more of Examples 1-7 optionally include, wherein: the other UE is a wearable UE, and the processing circuitry is configured to communicate data from the other UE to a base station.

In Example 9, the subject matter of any one or more of Examples 1-8 optionally include, wherein: the DMRS locations are determined based on a temporary ID of the UE.

In Example 10, the subject matter of any one or more of Examples 1-9 optionally include, wherein the processing circuitry is configured to: determine whether any other UE is associated with the UE to form a personal area network (PAN), and in response to a determination that the UE is unassociated with the other UE, avoid transmission of the DMRS.

In Example 11, the subject matter of any one or more of Examples 1-10 optionally include, wherein: the shared channel comprises at least one of a common control channel, a Transmitter resource Acquisition and Sounding (TAS) channel, a Receiver resource Acknowledgement and Sounding (RAS) channel, and an acknowledgment (ACK) channel.

In Example 12, the subject matter of any one or more of Examples 1-11 optionally include, wherein: the DMRS locations are disposed on at least one of different subcarriers or symbols in the RU.

In Example 13, the subject matter of any one or more of Examples 1-12 optionally include, wherein: the processing circuitry comprises a baseband processor, and the apparatus further comprises a transceiver configured to communicate with the other UE.

Example 14 is an apparatus of user equipment (UE), the apparatus comprising: memory; and processing circuitry in communication with the memory and arranged to: detect a Demodulation Reference Signal (DMRS) received from another UE, the DMRS being random sequences and disposed at locations in a resource unit (RU) of a predetermined Physical Resource Allocation (PRA) in a shared data or control channel; measure the DMRS; and encode channel quality information based on the measured DMRS for transmission to the other UE.

In Example 15, the subject matter of Example 14 optionally includes, wherein: each RU of the PRA comprises a pair of DMRS having a transmission power higher than that of data signals in the RU of another PRA in the shared data or control channel.

In Example 16, the subject matter of any one or more of Examples 14-15 optionally include, wherein: the DMRS locations are disposed on at least one of different subcarriers or symbols in the RU.

In Example 17, the subject matter of any one or more of Examples 14-16 optionally include, wherein: the DMRS locations are repeated every predetermined number of subframes, and the processing circuitry is configured to detect the predetermined number of subframes from one of: higher layer signaling or as a configuration parameter in a broadcast.

In Example 18, the subject matter of any one or more of Examples 14-17 optionally include, wherein: the DMRS locations are repeated every predetermined number of RUs of the shared data channel in a subframe, the predetermined number being an integer greater than 1, and the processing circuitry is configured to detect the predetermined number of RUs from one of: higher layer signaling or as a configuration parameter in a broadcast.

In Example 19, the subject matter of any one or more of Examples 14-18 optionally include, wherein: the apparatus is a wearable UE and the processing circuitry is configured to communicate data through the other UE to a base station.

In Example 20, the subject matter of any one or more of Examples 14-19 optionally include, wherein: the DMRS locations are determined based on a temporary ID of the other UE.

Example 21 is a computer-readable storage medium that stores instructions for execution by one or more processors of a user equipment (UE), the one or more processors to: randomize Demodulation Reference Signal (DMRS) locations of a DMRS in a resource unit of a predetermined Physical Resource Allocation (PRA) of a shared channel for transmission to another UE; generate random DMRS sequences for transmission to the other UE in the DMRS locations; and in response to transmission of the DMRS, decode channel quality information from the other UE based on the DMRS.

In Example 22, the subject matter of Example 21 optionally includes, wherein: the DMRS locations are disposed on at least one of different subcarriers or symbols in the RU.

In Example 23, the subject matter of any one or more of Examples 21-22 optionally include, wherein: the DMRS locations are determined based on a temporary ID of the UE.

In Example 24, the subject matter of any one or more of Examples 21-23 optionally include, wherein the instructions further configure the one or more processors to: replicate the DMRS locations every predetermined number of subframes, and one of: configure the predetermined number of subframes by higher layer signaling or broadcast as a configuration parameter.

In Example 25, the subject matter of any one or more of Examples 21-24 optionally include, wherein the instructions further configure the one or more processors to: replicate the DMRS locations every predetermined number of RUs of the shared data channel in a subframe, the predetermined number being an integer greater than 1, and configure the predetermined number of RUs by higher layer signaling or broadcast as a configuration parameter.

In Example 26, the subject matter of any one or more of Examples 21-25 optionally include, wherein the instructions further configure the one or more processors to: condition transmission of the DMRS based on at least one of a collision or contention probability, the at least one of a collision or contention probability based on at least one of a number of other UEs in a personal area network (PAN) associated with the UE or a density of neighboring PANs associated with other UEs, and in response to a determination that the at least one of the collision or contention probability is less than a predetermined value, avoid use of the shared channel for transmission of the DMRS.

In Example 27, the subject matter of any one or more of Examples 21-26 optionally include, wherein: the shared channel comprises a shared data channel.

In Example 28, the subject matter of any one or more of Examples 21-27 optionally include, wherein: the shared channel comprises at least one of a common control channel, a Transmitter resource Acquisition and Sounding (TAS) channel, a Receiver resource Acknowledgement and Sounding (RAS) channel, and an acknowledgment (ACK) channel.

Example 29 is an apparatus of a user equipment (UE), the apparatus comprising: means for randomizing Demodulation Reference Signal (DMRS) locations of a DMRS in a resource unit of a predetermined Physical Resource Allocation (PRA) of a shared channel for transmission to another UE; means for generating random DMRS sequences for transmission to the other UE in the DMRS locations; and means for decoding, in response to transmission of the DMRS, channel quality information from the other UE based on the DMRS.

In Example 30, the subject matter of Example 29 optionally includes, wherein: the DMRS locations are disposed on at least one of different subcarriers or symbols in the RU.

In Example 31, the subject matter of any one or more of Examples 29-30 optionally include, wherein: the DMRS locations are determined based on a temporary ID of the UE.

In Example 32, the subject matter of any one or more of Examples 29-31 optionally include, further comprising: means for replicating the DMRS locations every predetermined number of subframes, and means for configuring the predetermined number of subframes by higher layer signaling or broadcast as a configuration parameter.

In Example 33, the subject matter of any one or more of Examples 29-32 optionally include, further comprising: means for replicating the DMRS locations every predetermined number of RUs of the shared data channel in a subframe, the predetermined number being an integer greater than 1, and means for configuring the predetermined number of RUs by higher layer signaling or broadcast as a configuration parameter.

In Example 34, the subject matter of any one or more of Examples 29-33 optionally include, further comprising: means for conditioning transmission of the DMRS based on at least one of a collision or contention probability, the at least one of a collision or contention probability based on at least one of a number of other UEs in a personal area network (PAN) associated with the UE or a density of neighboring PANs associated with other UEs, and in response to a determination that the at least one of the collision or contention probability is less than a predetermined value, means for avoiding use of the shared channel for transmission of the DMRS.

In Example 35, the subject matter of any one or more of Examples 29-34 optionally include, wherein: the shared channel comprises a shared data channel.

In Example 36, the subject matter of any one or more of Examples 29-35 optionally include, wherein: the shared channel comprises at least one of a common control channel, a Transmitter resource Acquisition and Sounding (TAS) channel, a Receiver resource Acknowledgement and Sounding (RAS) channel, and an acknowledgment (ACK) channel.

Example 37 is an method of providing a Demodulation Reference Signal (DMRS) from a user equipment (UE), the method comprising: randomizing DMRS locations of a DMRS in a resource unit of a predetermined Physical Resource Allocation (PRA) of a shared channel for transmission to another UE; generating random DMRS sequences for transmission to the other UE in the DMRS locations; and decoding, in response to transmission of the DMRS, channel quality information from the other UE based on the DMRS.

In Example 38, the subject matter of Example 37 optionally includes, wherein: the DMRS locations are disposed on at least one of different subcarriers or symbols in the RU.

In Example 39, the subject matter of any one or more of Examples 37-38 optionally include, wherein: the DMRS locations are determined based on a temporary ID of the UE.

In Example 40, the subject matter of any one or more of Examples 37-39 optionally include, further comprising: replicating the DMRS locations every predetermined number of subframes, and configuring the predetermined number of subframes by higher layer signaling or broadcast as a configuration parameter.

In Example 41, the subject matter of any one or more of Examples 37-40 optionally include, further comprising: replicating the DMRS locations every predetermined number of RUs of the shared data channel in a subframe, the predetermined number being an integer greater than 1, and configuring the predetermined number of RUs by higher layer signaling or broadcast as a configuration parameter.

In Example 42, the subject matter of any one or more of Examples 37-41 optionally include, further comprising: conditioning transmission of the DMRS based on at least one of a collision or contention probability, the at least one of a collision or contention probability based on at least one of a number of other UEs in a personal area network (PAN) associated with the UE or a density of neighboring PANs associated with other UEs, and in response to a determination that the at least one of the collision or contention probability is less than a predetermined value, avoiding use of the shared channel for transmission of the DMRS.

In Example 43, the subject matter of any one or more of Examples 37-42 optionally include, wherein: the shared channel comprises a shared data channel.

In Example 44, the subject matter of any one or more of Examples 37-43 optionally include, wherein: the shared channel comprises at least one of a common control channel, a Transmitter resource Acquisition and Sounding (TAS) channel, a Receiver resource Acknowledgement and Sounding (RAS) channel, and an acknowledgment (ACK) channel.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A user equipment device (UE), comprising:
   memory; and
   processing circuitry in communication with the memory and configured to cause the UE to:
   randomize Demodulation Reference Signal (DMRS) locations of a DMRS in a resource unit (RU) of a Physical Resource Allocation (PRA) of a shared channel for transmission to an other UE, wherein the DMRS locations are determined based on a temporary ID of the UE;
   generate DMRS sequences for transmission to the other UE in the DMRS locations; and
   in response to transmission of the DMRS, decode information received from the other UE based on characteristics of received DMRS transmissions.

2. The UE of claim 1,
   wherein the DMRS sequences are random sequences defined by one of a length-31 Gold sequence or a Zadoff-Chu sequence.

3. The UE of claim 2,
   wherein each random sequence is mapped onto M-ary phase shift keying (MPSK) signal modulation.

4. The UE of claim 2,
   wherein respective RUs of the PRA comprise respective pairs of DMRS having a transmission power higher than that of data signals in a first RU of another PRA in the shared channel.

5. The UE of claim 2,
   wherein the processing circuitry is further configured to cause the UE to:
   replicate the DMRS locations every predetermined number of subframes; and
   configure the predetermined number of subframes by higher layer signaling or by broadcast as a configuration parameter.

6. The UE of claim 2,
   wherein the processing circuitry is further configured to cause the UE to:
   replicate the DMRS locations every predetermined number of RUs of the shared channel in a subframe; and
   configure the predetermined number of RUs by higher layer signaling or by broadcast as a configuration parameter.

7. The UE of claim 6,
   wherein the predetermined number is an integer greater than 1.

8. The UE of claim 2,
   wherein the shared channel is a shared data channel and the processing circuitry is further configured to cause the UE to:
   condition transmission of the DMRS based on at least one of a collision or contention probability, wherein the at least one of the collision or contention probability is based on at least one of a number of other UEs in a personal area network (PAN) associated with the UE or a density of neighboring PANs associated with other UEs; and
   in response to a determination that the at least one of the collision or contention probability is less than a predetermined value, avoid use of the shared data channel for transmission of the DMRS.

9. The UE of claim 2,
   wherein the other UE is a wearable UE, and wherein the processing circuitry is further configured to cause the UE to communicate data from the other UE to a base station.

10. The UE of claim 2,
    wherein the processing circuitry is further configured to cause the UE to:
    determine whether any other UE is associated with the UE to form a personal area network (PAN); and
    in response to a determination that the UE is unassociated with the other UE, avoid transmission of the DMRS.

11. The UE of claim 2,
    wherein the shared channel comprises at least one of a common control channel, a Transmitter resource Acquisition and Sounding (TAS) channel, a Receiver resource Acknowledgement and Sounding (RAS) channel, or an acknowledgment (ACK) channel.

12. The UE of claim 2,
    wherein the DMRS locations are disposed on at least one of different subcarriers or symbols in the RU.

13. The UE of claim 2,
    wherein the processing circuitry comprises a baseband processor; and
    wherein the UE further comprises a transceiver configured to communicate with the other UE.

14. An apparatus, comprising:
    memory; and
    a processor in communication with the memory and configured to cause a user equipment device (UE) to:
    detect a Demodulation Reference Signal (DMRS) received from an other UE, wherein the DMRS are random sequences and disposed at locations in a resource unit (RU) of a Physical Resource Allocation (PRA) of a shared channel, wherein the locations are determined based on a temporary ID of the other UE;
    measure the DMRS; and
    encode channel quality information based on the measured DMRS for transmission to the other UE.

15. The apparatus of claim 14,
    wherein respective RUs of the PRA comprise respective pairs of DMRS having a transmission power higher than that of data signals in a first RU of another PRA in the shared channel.

16. The apparatus of claim 14,
    wherein the locations are disposed on at least one of different subcarriers or symbols in the RU.

17. The apparatus of claim 14,
    wherein the locations are repeated at a predetermined number of subframes; and wherein the processor is further configured to cause the UE to detect the predetermined number of subframes from one of higher layer signaling or as a configuration parameter in a broadcast.

18. The apparatus of claim 14,
wherein the locations are repeated at a predetermined number of RUs of the shared channel in a subframe; and
wherein the processor is further configured to cause the UE to detect the predetermined number of RUs is from one of: higher layer signaling or as a configuration parameter in a broadcast.

19. The apparatus of claim 18,
wherein the predetermined number is an integer greater than 1.

20. The apparatus of claim 14,
wherein the apparatus is a wearable UE; and
wherein the processor is further configured to cause the UE to communicate data through the other UE to a base station.

21. A non-transitory computer-readable storage medium that stores instructions for execution by one or more processors of a user equipment (UE), the one or more processors to:
randomize-Demodulation Reference Signal (DMRS) locations of a DMRS in a resource unit (RU) of a Physical Resource Allocation (PRA) of a shared channel for transmission to an other UE, wherein the DMRS locations are determined based on a temporary ID of the UE;
generate DMRS sequences for transmission to the other UE in the DMRS locations; and
in response to transmission of the DMRS, decode information received from the other UE based on characteristics of received DMRS transmissions.

22. The non-transitory computer-readable storage medium of claim 21,
wherein the DMRS locations are disposed on at least one of different subcarriers or symbols in the RU.

23. The non-transitory computer-readable storage medium of claim 21,
wherein the DMRS sequences are random sequences defined by one of a length-31 Gold sequence or a Zadoff-Chu sequence.

24. The non-transitory computer-readable storage medium of claim 21,
wherein the instructions are further executable to configure the one or more processors to:
replicate the DMRS locations every predetermined number of subframes, and
configure the predetermined number of subframes by higher layer signaling or broadcast as a configuration parameter.

25. The non-transitory computer-readable storage medium of claim 21,
wherein the instructions are further executable to configure the one or more processors to:
replicate the DMRS locations every predetermined number of RUs of the shared channel in a subframe, wherein the predetermined number is an integer greater than 1, and
configure the predetermined number of RUs by higher layer signaling or broadcast as a configuration parameter.

26. The non-transitory computer-readable storage medium of claim 21,
wherein the instructions are further executable to configure the one or more processors to:
condition transmission of the DMRS based on at least one of a collision or contention probability, the at least one of a collision or contention probability based on at least one of a number of other UEs in a personal area network (PAN) associated with the UE or a density of neighboring PANs associated with other UEs; and
in response to a determination that the at least one of the collision or contention probability is less than a predetermined value, avoid use of the shared channel for transmission of the DMRS.

\* \* \* \* \*